Aug. 20, 1929.  E. MOWRY ET AL  1,725,409
TRACTOR DISK HARROW
Filed March 14, 1928   2 Sheets-Sheet 2

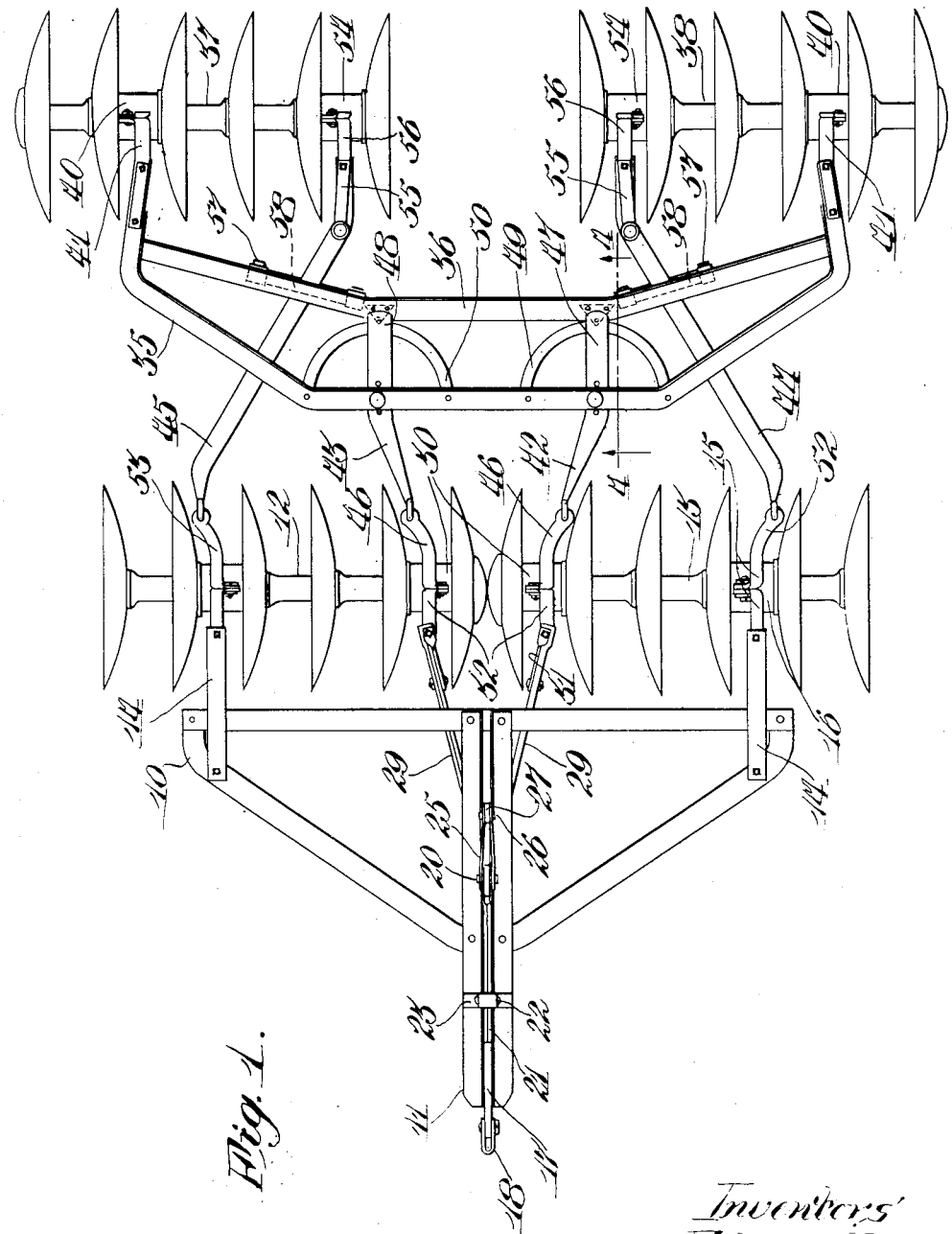

Inventors
Edward Mowry,
Joseph R. Barker
By H.P. Doolittle
Atty.

Patented Aug. 20, 1929.

1,725,409

UNITED STATES PATENT OFFICE.

EDWARD MOWRY, OF ROCK FALLS, ILLINOIS, AND JOSEPH R. BARKER, OF FALL BROOK, CALIFORNIA, ASSIGNORS TO INTERNATIONAL HARVESTER COMPANY, A CORPORATION OF NEW JERSEY.

TRACTOR DISK HARROW.

Application filed March 14, 1928. Serial No. 261,426.

This invention relates to improvements in tractor disk harrows of the four gang tandem type, and particularly to the manner of connecting the front and rear sections of the harrow and of effecting adjustment of the gangs.

The main object of the invention is to provide a simplified structure affording the necessary flexibility between the two sections of the harrow for allowing the gangs to follow the variations in the ground surface. A further object is to so dispose the several points of pivotal connection between the frame and gangs as to make adjustment of the gangs, from a single point of control, positive and certain. Still another object of the invention is to provide structure which will cause the rear gangs to maintain proper trailing relation with the front gangs when traveling in straight forward direction, and to cause the rear gangs to automatically assume angles tending to make them trail in the paths of the forward gangs during turning movement of the harrow.

The above and other objects and advantages are attained by the combination of parts and details of construction, or mechanical equivalents thereof, hereinafter more particularly described and illustrated in the accompanying drawings, wherein:

Figure 1 is a plan view of a tandem disk harrow embodying the invention;

Figure 4:
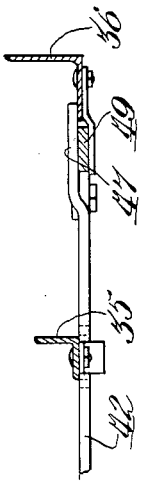
Figure 4 is a detail vertical section taken on the line 4—4 of Figure 1.

In the preferred embodiment illustrated, the novel harrow structure consists of a front, transversely extended frame 10 having central, forwardly extending, spaced, parallel bars 11 constituting the draft tongue. A pair of disk gangs 12 and 13 are pivoted for horizontal, angular adjustment to the respective ends of frame 10 by means of draft links 14 which are pivoted to the frame and to the upper ends of upright standards 15 on the bearing boxes 16 in which the outer portions of the gangs' axles are mounted. The point of pivotal connection to the gangs is preferably to the outer side of the centers of the gangs and near the outer ends thereof, as shown on the drawings. The horizontal angular adjustment of the front gangs to and from angled position may be effected by any preferred means. In this instance, there is illustrated a slidable draft head 17 movable in the space between the twin bars of the tongue 11 and supported on cross pins 17ª (Figure 2) engaging longitudinal slots 17ᵇ in the cross head. The forward end of the draft head 17 carries a clevis 18 for connection to a tractor, and its rear end is upturned, as at 19 (Figure 2), to afford a point of pivotal connection through a bolt 20 for a ratchet bar 21 which rides over a transverse latch pin 22 carried in a guide yoke 23, which is fixed to the tongue 11. An operating cord or link extending to the operator's position on the tractor is received in the aperture 24 in the forward end of the ratchet bar 21. The pivot bolt 20 also serves to connect a rearwardly extending link 25 to the draft head, and the rear end of this link is pivotally connected at 26 to the upper end of a lever 27 which is pivoted on a horizontal axis intermediate its ends to the bars of the tongue 11, as by means of a cross pin 28. Two links 29 connect the lower end of lever 27 to the bearing boxes 30 on the inner ends of the front gangs, respectively. Brace links 31 connect each link 29 with forwardly extending arms 32 on upright standards extending from the boxes 30.

The rear section of the harrow consists of a transversely extended frame preferably comprising a forwardly arched or bowed bar 35 braced by an inner arched bar 36, both bars lying in the same horizontal plane. Two disk gangs 37 and 38 are pivotally connected to the respective ends of the frame bar 35, the ends of which are formed with downward extensions 39 (Figure 2) pivoted to a bearing box 40 on the outer end of the gang and co-axial to a forwardly projecting arm 41 on an upright standard projecting from the bearing box 40. As in the case of the front gangs, the point of pivotal connection of the rear gangs to the frame is outwardly of the centers of said gangs.

Figure 2:
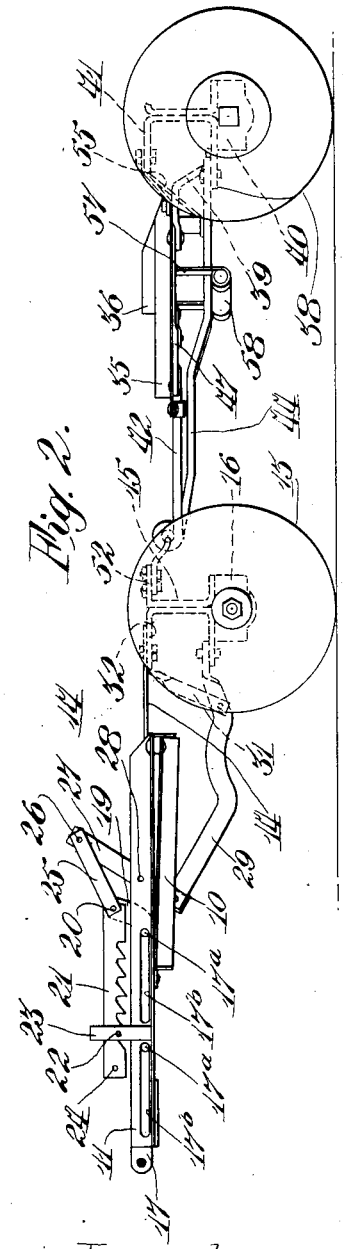
Figure 2 is a side elevation of the structure shown in Figure 1.

The combined draft and angling connections between the frames and gangs consists of two central connecting links 42, 43, and two outer links or reach bars 44, 45. Each of the central links is pivoted to the end of a horizontal arm 46 projecting rearwardly from the standards on the bearing box 30 at the inner ends of the front gangs. The links 42, 43 extend rearwardly and are pivoted on vertical axes to the central portion of the forward frame bar 35 at points equally spaced on each side of the central longitudinal line of the harrow. In order to support the rear frame in horizontal position, the links 42, 43 are formed with rearward extensions 47, 48, the ends of which are offset upwardly (Figure 4) to overlap the upper surfaces of arcuate guide bars 49, 50, which have the pivot points of the bars 42, 43 as centers. The outer bars 44, 45 have their front ends pivotally connected to horizontal, rearwardly extending arms 52, 53, respectively projecting from the standards 15 on the outer bearing boxes 16 of the front gangs. Bars 44, 45 extend below the rear frame rearwardly in converging relation and are pivoted to bearing boxes 54 on the inner ends of the rear gangs. Preferably each of the bars 44, 45 is provided with a brace bar 55 co-axially pivoted to the upper end of a standard 56 on the bearing box 54. As seen in Figure 2, the bars 44, 45 are preferably bent downwardly intermediate their ends to bring them into substantial alinement with the bearing boxes 54 on the rear gangs, and depending brackets 57 are secured to bar 36 of the frame and carry rollers 58 over which the bars travel during angular movement of the gangs and by which the bars and inner ends of the gangs are supported at the desired level.

Figure 3:
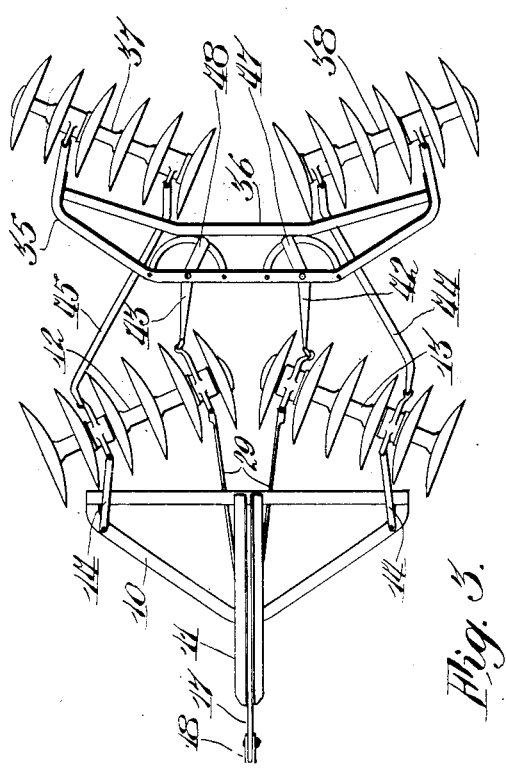
Figure 3 is a plan view on a reduced scale showing the harrow with the gangs in angled or operating position.

In operation it will be seen that fore and aft movement imparted to the draft head 17, through forward and backward movement of the tractor, will be imparted through links 29 to the front gangs and transmitted through the central links 42, 43 to the rear frame, thus shifting said frame in a fore and aft direction in unison with the motion of the draft head. As the inner ends of the rear gangs are anchored or held against movement with respect to the front frame by the outer links 44, 45 which connect the inner ends of the rear gangs to the outer ends of the front frame through draft links 14 and arms 52, 53, the result of the fore and aft movement of the rear frame will be to throw the rear gangs into forwardly converging angle upon reverse movement being imparted to the front gangs. The change of positions will be clear from Figures 1 and 3. The relation of pivot points between the frames and gangs is such as to maintain the gangs in proper trailing relation to the front gangs and resist side sway thereof in straight forward travel, but upon turning movement of the harrow the outer reach bars 44 and 45 will move axially in opposite directions and the rear gangs will be automatically changed in angle to favor trailing in the direction of turn of the front gangs.

The above construction exemplifies a preferred embodiment of the invention, but changes therein are contemplated and may be made within the scope of the invention as defined in the following claims.

What is claimed as new is:

1. A tandem disk harrow comprising front and rear frames, a pair of horizontally angularly adjustable disk gangs pivoted on the respective ends of each frame at points on the gangs intermediate the ends thereof, means on the front frame for angularly adjusting the front pair of gangs, and means for shifting the rear frame in a fore and aft direction through angular adjustment of the front gangs comprising links pivoted to the inner ends of the front gangs respectively and pivoted to the rear frame on either side of the longitudinal median line thereof, links extending below the rear frame and connecting the inner ends of the rear gangs with the front frame at the pivot points of the front gangs, and means on the under side of the rear frame for supporting said last named links.

2. A tandem disk harrow comprising a transversely extended front frame, a pair of horizontally angularly adjustable disk gangs pivoted to the ends of said frame at points on the gangs spaced outwardly from the centers thereof, means on said frame for angularly adjusting said pair of gangs, a rear frame comprising a transversely extended forwardly arched bar, a pair of horizontally angularly adjustable disk gangs pivoted to the ends of said bar at points on said gangs spaced outwardly from the centers thereof, a pair of pivoted links connecting the inner ends of the front gangs with the central portion of said bar, link connections extending below the arched bar and pivoted to the inner ends of the rear gangs and the respective ends of the front frame, and means on the arched bar for supporting said link connections.

3. A tandem disk harrow comprising a transversely extended front frame, a pair of horizontally angularly adjustable disk gangs pivoted to the ends of said frame at points on the gangs spaced outwardly from the centers thereof, means on said frame for angularly adjusting said pair of gangs, a rear frame comprising a transversely extended bar, a pair of horizontally angularly adjustable disk gangs pivoted to the ends of said bar at points on said gangs spaced outwardly from the centers thereof, a pair of draft links pivoted to said bar on vertical axes at each side of the center of said bar, rearwardly extending arcuate guide bars connected to said bar and centered on the pivots of said draft links, extensions on said links slidably engaging the arcuate bars, pivotal connections between said draft links and the inner ends of the front gangs, and link connections between the inner ends of the rear gangs and the respective ends of the front gangs.

4. A tandem disk harrow comprising front and rear transversely extended frames, a pair of horizontally angularly adjustable disk gangs pivoted on the respective ends of said frames at points on the gangs intermediate the ends thereof, and combined draft and angling connections between the frames and gangs comprising a pair of bars pivoted to the rear frame and connected respectively to the inner ends of the front gangs, means on said rear frame and bars cooperating to maintain the rear frame in horizontal position, and a second pair of bars connecting the inner ends of the rear gangs with the respective ends of the front frame.

In testimony whereof we affix our signatures.

EDWARD MOWRY.
JOSEPH R. BARKER.